United States Patent Office 2,988,517
Patented June 13, 1961

2,988,517
PREPARATION OF VINYL ESTER CATALYST
John E. Bristol, Lewiston, and Ralph A. Call, Niagara Falls, N.Y., assignors to E. I. du Pont de Nemours and Company, Wilmington, Del., a corporation of Delaware
No Drawing. Filed Dec. 9, 1957, Ser. No. 701,309
9 Claims. (Cl. 252—428)

This invention relates to catalysts for the preparation of vinyl esters by the vapor phase reaction of acetylene and aliphatic monocarboxylic acids containing 1 to 4 carbon atoms and to a method for preparing such catalysts.

A commonly used cataylst for the preparation of vinyl esters consists of active carbon as the carrier or support for the zinc salt of the acid corresponding to the ester, thus active carbon impregnated with zinc acetate is used in the manufacture of vinyl acetate. Heretofore, such catalysts have been prepared by the impregnation of active carbon with a saturated or less than saturated aqueous solution of the zinc salt. Since the amount of solution which can be adsorbed on the carbon support is limited by the activity of the carbon, the amount of zinc salt which can be applied is likewise limited. The amount of zinc salt is expressed in terms of the equivalent zinc content of the zinc salt-impregnated carbon support.

The activity of the carbon may be expressed in terms of the percent carbon tetrachloride adsorption which may be determined by the method described by H. W. Stone and R. O. Clinton in Industrial and Engineering Chemistry, Analytical Edition, volume 14, pages 131–5, February 15, 1942. For a carbon with an activity of 65% carbon tetrachloride adsorption, we have found that about 6% zinc based on the catalyst can be impregnated on the support using a saturated solution of zinc acetate.

Since the productivity of the catalyst in terms of the vinyl acetate produced per unit of catalyst is generally increased at higher zinc contents, it is often desirable to have 8% or more zinc in the catalyst. This may be accomplished by using an excess of saturated zinc acetate solution, but difficulties with lump formation are increased. Lump formation is an important consideration because it reduces the yield of catalyst, reduces the rate of drying of the catalyst and requires the use of additional labor and equipment to screen and break up the lumps formed. Some lump formation is observed when catalysts containing 6% or less zinc are prepared, but it is accentuated when excess zinc acetate solution is used to increase the zinc content to 8 to about 20%. Moreover, the use of excess solution to obtain these levels of zinc content tends to cause the deposition of crystalline zinc acetate on the carbon and also to reduce the residual carbon tetrachloride adsorption of the catalyst to a value of less than 8%. It has been our experience that both the presence of crystalline zinc acetate such as can be detected by X-ray diffraction and residual carbon tetrachloride adsorption of less than about 8% result in a decrease in the productivity of the catalyst. Moreover, for any particular carbon support, it appears that the higher the residual carbon tetrachloride adsorption, the longer will be the life of the catalyst in the vinyl ester preparation.

Lump formation may be caused by the zinc acetate cementing the carbon particles together during drying. This is accentuated by the use of excess zinc acetate solution since in this case, excess solution is present which wets the surface of the carbon particles. A reduction in water content of the impregnating solution would therefore be expected to reduce the lump formation and also reduce the drying time. However, attempts to decrease the amount of water by use of supersaturated solutions of zinc acetate or saturated solutions containing a suspension of solid zinc acetate have invariably shown excessive lumping. Moreover, the catalysts contained large amounts of crystalline zinc acetate and showed low residual carbon tetrachloride adsorption with the result that the productivity of the catalysts was very low.

It is an object of this invention to provide an improved method for preparation of catalysts for vinyl ester manufacture. Another object is the preparation of catalysts with increased productivity in the vapor phase preparation of vinyl ester. A further objective is to avoid lump formation in the preparation of a catalyst consisting of a zinc salt supported on active carbon. A further objective is to provide catalysts with higher zinc content without lump formation and with higher productivity and high residual carbon tetrachloride adsorption. A still further objective is the reduction of the drying time in the preparation of a catalyst consisting of zinc acetate supported on active carbon. Other objects will be apparent as the invention is further described.

According to this invention, we accomplish these objectives by preparation of zinc-salt-impregnated active carbon catalysts suitable for the vapor phase preparation of vinyl esters from acetylene and acids by dry-mixing active carbon and zinc oxide powder and containing the resulting mixture with the acid corresponding to the vinyl ester. The catalyst is then dried to remove the water formed by the reaction of the zinc oxide with the acid and any other water added as a diluent for the acid. The dry-mixing operation distributes the zinc oxide powder uniformly on the active carbon surface. On addition of the acid, the carbon becomes impregnated with the zinc salt of the acid and the subsequent drying operation can be effected without agglomeration and lump formation.

The invention is illustrated by the following examples:

EXAMPLE 1

Charge:
  1500 parts active carbon (30–150 mesh, 65% activity)
  225 parts (2.77 moles) zinc oxide powder
  675 parts (11.25 moles) glacial acetic acid
  1770 parts water

*Procedure A.—Preparation by impregnation from solution.*

A mixture of the zinc oxide, water and acetic acid was stirred until a clear solution was obtained. The active carbon was added to the solution and the mixture agitated for 1 hour and then dried at 100° C. under reduced pressure. The mixture was agitated during the drying which required 14 hours. The catalyst was discharged through a 20 mesh screen to give a catalyst yield of 85% of theory. The remaining 15% consisted of lumps which could not be crushed without damage to the carbon support.

*Procedure B.—Preparation by dry-mix technique*

A uniform dry mixture of the active carbon and zinc oxide was prepared by agitation for 1 hour and then the water and acetic acid were added. After further agitation for 1 hour, the mixture was dried and discharged as in A. The drying required 12 hours. The yield of catalyst was 94% of theory. The remaining 6% consistod of lumps which were readily crushed and were then satisfactory for use.

The catalyst from both preparations was satisfactory for use in the vapor phase preparation of vinyl acetate from acetylene and acetic acid in a fluidized catalyst bed reactor at 180–210° C. This example shows the reduction in lump formation and a slight reduction in drying time when using the dry-mix technique with the same water content as normally used in the solution impregnation method. In both of these preparations, the amount of water, including that formed in the neutralization of the zinc oxide by the acetic acid, was slightly more than 8 parts for each of zinc oxide.

EXAMPLE 2

The charge was the same as in Example 1. The catalyst was prepared by Procedures A and B of Example 1 with the exception that the catalyst in each case was dried at 130° C. for 8 hours with intermittent agitation. The residual carbon tetrachloride adsorption and crystallinity in the catalysts were determined. The catalysts were compared for effectiveness in the preparation of vinyl acetate in a fluidized catalyst bed reactor at a temperature of 196° C. and with an acetylene-acetic acid mole ratio of 3:1. The acetylene-acetic acid mixture fed to the reactor contained 20% nitrogen by volume as a diluent. The results are shown in Table I. The results indicate essentially no difference in activity of the catalysts when prepared by the two procedures using the amount of water normally used in the solution impregnation method, that is, the amount required to give a saturated or slightly less than saturated solution of zinc acetate. The residual carbon tetrachloride adsorption of the dry-mix catalyst was the higher.

EXAMPLE 3

The charge and procedure were the same as in Example 2, Procedure B, except that 850 parts of water were used. The total water including that formed in the neutralization of the zinc oxide amounted to 900 parts or 4 parts for each part of zinc oxide. The time required for drying was slightly more than one half that required for the catalyst in Example 2. The catalyst was characterized as in Example 2. The results, which are summarized in Table I, indicate that the catalyst was the equivalent of catalyst 2B prepared with about double the amount of water.

EXAMPLE 4

The charge and procedure were the same as in Example 2, Procedure B, except that 400 parts of water were used. No lump formation was observed. The total water including that formed in the neutralization of the zinc oxide amounted to 450 parts or 2 parts for each part of zinc oxide. The time required for drying was slightly more than one quarter that required for the catalyst in Example 2. The catalyst was characterized as in Example 2. The results are summarized in Table I. The results indicate that the reduction in water to the level of about 2 parts for each part of zinc oxide gave a more productive catalyst and a higher residual carbon tetrachloride adsorption.

EXAMPLE 5

Charge:
  1500 parts active carbon (30–150 mesh, 65% activity)
  225 parts zinc oxide powder
  675 parts glacial acetic acid
  400 parts water The charge was the same as in Example 4. The catalyst was prepared by the solution impregnation method of Example 1, Procedure A. The zinc oxide, water, and acetic acid were mixed to give a slurry of solid zinc acetate in a saturated zinc acetate solution. The carbon was added and the catalyst then dried at 130° C. Some lump formation occurred. The catalyst was characterized as in Example 2. The results, which are summarized in Table I, indicate that an inferior catalyst is obtained if the water content is decreased in the solution impregnation method below that required to dissolve all the zinc acetate present.

EXAMPLE 6

Charge:
  1500 parts active carbon (30–150 mesh, 65% activity)
  260 parts (3.20 moles) zinc oxide powder
  780 parts (13.0 moles) glacial acetic acid
  980 parts water The dry-mix technique of Example 2, Procedure B, was used with the ratio of water to zinc oxide about the same as in Example 3. The catalyst was characterized as before, and the results are shown in Table I. A comparison of the results with Catalysts 3 and 6, which were prepared under the same conditions, indicates the higher productivity of the catalyst at higher zinc content. The results with Catalysts 2A and 6 indicate that a higher zinc content at the same residual carbon tetrachloride adsorption can be obtained by the dry-mix technique than by the solution impregnation method. This is also indicated by the higher residual carbon tetrachloride adsorption of the catalysts made by the dry-mix technique at the 9% zinc level. Thus, the higher residual adsorption means that a greater amount of additional zinc could be added to Catalysts 2B, 3 and 4 than to Catalyst 2A without decreasing the residual adsorption below the value of about 8% which is required for good productivity.

*Table I*

| Catalyst | Percent Zinc | Residual CCl$_4$ Adsorption, Percent | Crystallinity by X-Ray Diffraction | WTY [1] |
|---|---|---|---|---|
| 2A | 9.0 | 10 | None | 1.84 |
| 2B | 9.0 | 15 | None | 1.83 |
| 3 | 9.0 | 15 | None | 1.84 |
| 4 | 9.0 | 20 | None | 2.04 |
| 5 | 9.0 | 6 | Present | 1.40 |
| 6 | 10.0 | 10 | None | 1.94 |

[1] WTY is weight time yield, the units being gram moles of vinyl acetate made per kilogram of catalyst per hour.

EXAMPLE 7

Charge:
  1500 parts active carbon (30–150 mesh, 65% activity)
  225 parts (2.77 moles) zinc oxide powder
  675 parts (11.25 moles) glacial acetic acid The dry-mix technique was used without any added water. The WTY of the catalyst under the same conditions of vinyl acetate preparation used in Example 2 was 1.57.

EXAMPLE 8

Charge:
  1500 parts active carbon (30–150 mesh, 65% activity)
  225 parts (2.77 moles) zinc oxide powder
  800 parts (13.33 moles) glacial acetic acid The dry-mix technique was used without any added water. The WTY of the catalyst under the same conditions of vinyl acetate preparation used in Example 2 was 1.85.

Examples 7 and 8 illustrate that catalysts can be prepared in the absence of added water, but to obtain the activity expected from the zinc content, more acid is required than when acid and added water are both used. The examples indicate that without added water, 4 moles of acetic acid per mole of zinc oxide were not enough for normal activity while 4.8 moles were sufficient.

The dry-mix technique can be used to impregnate the active carbon support wtih varying amounts of zinc by changing the amount of zinc oxide. This is illustrated by Examples 9–13 in which a 30–150 mesh carbon with an activity of 115% was impregnated with 8.2 to 18.2% zinc, using about the same ratio of water to zinc oxide as in Example 3.

EXAMPLES 9-13

| Example | Charge | | | |
|---|---|---|---|---|
| | Carbon | Zinc Oxide | Acetic Acid | Water |
| 9 | 1,500 | 200 | 600 | 750 |
| 10 | 1,500 | 380 | 1,140 | 1,430 |
| 11 | 1,500 | 480 | 1,440 | 1,800 |
| 12 | 1,500 | 600 | 1,800 | 2,260 |
| 13 | 1,500 | 690 | 2,070 | 2,600 |

The residual carbon tetrachloride adsorption and the productivity of the catalysts in the preparation of vinyl acetate were determined as before. The results are summarized in Table II.

Table II

| Catalyst | Percent Zinc | Residual CCl₄ Adsorption, Percent | WTY |
|---|---|---|---|
| 9 | 8.2 | 67 | 2.03 |
| 10 | 13.0 | 34 | 3.05 |
| 11 | 15.0 | 25 | 3.13 |
| 12 | 17.0 | 16 | 3.06 |
| 13 | 18.2 | 7 | 2.60 |

These results indicate the increase in productivity of the catalysts as the zinc content was increased up to a certain point. Beyond that point, the additional zinc did not improve the productivity of the catalyst, but continued to decrease the residual carbon tetrachloride adsorption. The productivity decreased markedly when the residual adsorption reached 7%.

The method of this invention can be used for the preparation of catalysts for the vapor phase preparation of vinyl esters of aliphatic monocarboxylic acids containing from 1 to 4 carbon atoms. This includes the vinyl esters of formic, acetic, propionic and butyric acids. The catalyst containing the zinc salt corresponding to the vinyl ester is prepared by the treatment of the zinc oxide-active carbon mixture with the required acid.

In the dry-mixing step, both the zinc oxide powder and active carbon should be substantially dry and free-flowing. If the carbon-zinc oxide mixture contains more than about 2% water, the zinc oxide tends to agglomerate and is not uniformly distributed on the active carbon surface. The mixing can be effected by mechanical agitation, as, for example, with a rotating drum. The mixing is continued until a uniform mixture is obtained. This state is indicated when the charge acquires a gray, slate-like appearance.

Any type or size of activated carbon which is satisfactory as a support for the zinc salt catalysts used in the vapor phase preparation of vinyl esters can be used in our dry-mix procedure. For a fluidized bed reactor, the preferred carbon size is about 30 to 150 mesh (U.S. Bureau of Standards, Standard Sieve Series, 1919); but static bed reactors can use carbons as large as about 4 mesh. In general, the most productive catalysts can be prepared from highly active carbons. It is generally preferred that the activity of the carbon be 55% or greater, although the dry-mix procedure can be used with lower activity carbons. The dry-mix procedure can also be used with catalysts regenerated by the process of U.S. Patent 2,715,140 to add the amount of zinc required to obtain the desired ratio of zinc to carbon.

The commercial grades of zinc oxide powder, including the pigment grades, are generally satisfactory. These are normally finer than 200 mesh which is required to obtain good distribution of the zinc oxide on the carbon. The amount of zinc oxide used depends on the zinc content desired in the final catalyst. While this method is especially useful for preparation of catalysts containing 8% or more zinc, it also offers advantages in ease of operation and avoidance of lump formation at lower zinc levels. Generally, it is desired to operate at as high zinc levels as possible to obtain the highest productivity of the vinyl ester. We have found, however, that if the residual carbon tetrachloride adsorption of the impregnated catalyst falls below about 8%, too much zinc has been added and the productivity decreases. Our method permits the impregnation of more zinc on a carbon of given activity before the residual carbon tetrachloride adsorption falls below 8% than is possible by the solution impregnation method.

The mixture of zinc oxide and active carbon is contacted with acid at least equivalent to the zinc oxide content, that is, at least 2 moles of acid are used for every mole of zinc oxide. Generally, an aqueous solution of the acid or simultaneous addition of acid and water is employed. About 2 to 6 moles and preferably 3 to 4 moles of acid are used for each mole of zinc oxide when water is added with the acid. More acid can be used if desired, but use of greater amounts is costly and requires a longer drying time.

The amount of water used can be the same as is required to dissolve the zinc salt when the former method of catalyst preparation by impregnation of carbon with zinc salt solution is employed. This amount of water is about 8 parts for each part of zinc oxide. The water can be reduced to about 1 to 6 parts for each part of zinc oxide and obtain a marked reduction in the time required to dry the catalyst. Moreover, the reduction in water does not cause a loss in productivity of the catalyst, indeed reduction in the water to about 2 parts for each part of zinc oxide gave a more active catalyst. This is surprising because all attempts to reduce the water in the solution impregnation method by using supersaturated solutions or suspensions of the zinc salt in a saturated solution have led to inferior catalysts.

Elimination of substantially all the water, except that formed in the reaction of the zinc oxide with the acid, results in a catalyst of reduced activity unless the amount of acid is increased. Thus, for example, in the preparation of a zinc acetate-carbon catalyst with no added water, at least 4.5 moles and preferably 5 to 8 moles of commercial glacial acetic acid should be used for every mole of zinc oxide. Below about 4.5 moles of acid, the catalyst activity is generally unsatisfactory. More than 8 moles of acid may be used if desired, but the use of greater amounts is costly and requires a longer drying time. With or without added water, the acid should be in liquid form to obtain the most rapid conversion of the zinc oxide to the active zinc acetate.

An active catalyst may be prepared by passing the vapors of the acid, containing an inert diluent such as nitrogen if desired, over the dry mixture of active carbon and zinc oxide at a temperature from about 120° to 220° C. The temperature should be higher than the boiling point of the acid used and below the decomposition and sublimation temperatures of the zinc salt. The dry mixture of carbon and zinc oxide may be contacted with the acid vapor in the static or fluidized bed reactor to be used in the vinyl ester preparation. The contact with the vapor should be for the length of time required to convert sufficient zinc oxide to the active zinc salt to obtain the desired productivity from the catalyst.

The temperature of the liquid acid treatment is not critical. Normally, the zinc oxide-carbon mixture at room temperature is treated with the acid at room temperature. The temperature may rise as the result of the heats of neutralization, solution and adsorption and may reach about 90° C.

The primary purpose of the drying step is to remove the water added with the acid and formed by the reaction of the zinc oxide with the acid. The excess acid present would not be harmful, but water gives by-products in the vinyl ester preparation. The temperature for the drying may be about 200° C. or lower and reduced pressure may be used although it is not necessary. With zinc acetate-impregnated-carbon catalyst, the drying temperature should be less than 240° C. to avoid sublimation or decomposition of zinc acetate. The catalyst may be agitated during the drying operation or static drying may be used. This is in contrast to the solution impregnation method where agitation during drying is essential to minimize lump formation. The drying is continued until the water content is at the desired level, usually less than 1%.

Catalysts prepared by our method can be used in either fluid or static bed reactors for the preparation of vinyl esters, particularly for the preparation of vinyl esters of acids containing 1 to 4 carbon atoms, such as vinyl formate, vinyl acetate, vinyl propionate and vinyl butyrate, from acetylene and the corresponding acid.

Our method of catalyst preparation has advantages over the prior art method of impregnating carbon with zinc salt solutions in the avoidance of lump formation particularly at high zinc levels and reduction in the drying time. Surprisingly, the catalysts made by our procedure at reduced water contents show a higher productivity of vinyl esters than do catalysts made by the prior art method. The productivity of the catalysts can be further increased because more zinc can be added using our method without decreasing the residual carbon tetrachloride adsorption below the level required for high catalyst activity and without causing deposition of the crystalline zinc salt which lowers the activity of the catalyst.

We claim:

1. The method of preparation of a catalyst for the manufacture of a vinyl ester of an aliphatic monocarboxylic acid containing 1 to 4 carbon atoms from acetylene and the vapor of said acid, comprising dry-mixing zinc oxide powder and active carbon, contacting the mixture with at least 2 moles of said acid in liquid form per mole of zinc oxide and less than 8 parts of water for each part of zinc oxide, and drying the catalyst.

2. The method of preparation of a catalyst for the manufacture of vinyl acetate from acetylene and acetic acid vapor, comprising dry-mixing zinc oxide powder and active carbon, contacting the mixture with at least 2 moles of liquid acetic acid per mole of zinc oxide and less than 8 parts of water for each part of zinc oxide, and drying the catalyst.

3. The method of preparation of a catalyst for the manufacture of vinyl acetate from acetylene and acetic acid vapor, comprising dry-mixing zinc oxide powder and active carbon, contacting the mixture with at least 2 moles of liquid acetic acid per mole of zinc oxide and 1 to 6 parts of water for each part of zinc oxide, and drying the catalyst.

4. The method of claim 3 wherein the mixture of zinc oxide and active carbon is contacted with about 2 parts of water for each part of zinc oxide.

5. The method of claim 3 wherein the mixture of zinc oxide and active carbon is contacted with 2 to 6 moles of acetic acid per mole of zinc oxide and about 2 parts of water for each part of zinc oxide.

6. The method of claim 2 wherein the catalyst is dried to a water content of less than 1 percent.

7. The method of claim 2 wherein the zinc oxide powder is finer than 200 mesh.

8. The method of preparation of a catalyst for the manufacture of vinyl acetate from acetylene and acetic acid vapor comprising dry-mixing zinc oxide powder and active carbon, contacting the mixture with at least 4.5 moles of liquid glacial acetic acid per mole of zinc oxide, and drying the catalyst.

9. The method of claim 8 wherein from about 5 to 8 moles of glacial acetic acid per mole of zinc oxide are used.

References Cited in the file of this patent

UNITED STATES PATENTS 2,831,819   Schmidt _____ Apr. 22, 1958

UNITED STATES PATENT OFFICE
CERTIFICATE OF CORRECTION

Patent No. 2,988,517 June 13, 1961

John E. Bristol et al.

It is hereby certified that error appears in the above numbered patent requiring correction and that the said Letters Patent should read as corrected below.

Column 2, line 15, for "provide" read -- prepare --; line 26, for "containing" read -- contacting --; same column 2, line 64, for "consistod" read -- consisted --; column 3, line 6, after "each" insert -- part --; column 4, line 70, for "wtih" read -- with --; column 5, line 71, for "distribtuion" read -- distribution --.

Signed and sealed this 7th day of November 1961.

(SEAL)
Attest:

ERNEST W. SWIDER
Attesting Officer

DAVID L. LADD
Commissioner of Patents